United States Patent
Rao et al.

(10) Patent No.: US 9,251,161 B2
(45) Date of Patent: Feb. 2, 2016

(54) OBJECT DEDUPLICATION AND APPLICATION AWARE SNAPSHOTS

(71) Applicant: Dell Products L.P., Round Rock, TX (US)

(72) Inventors: Goutham Rao, Los Altos, CA (US); Eric Brueggemann, Cupertino, CA (US); Carter George, Portland, OR (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 14/245,084

(22) Filed: Apr. 4, 2014

(65) Prior Publication Data

US 2014/0222769 A1  Aug. 7, 2014

Related U.S. Application Data

(63) Continuation of application No. 12/574,990, filed on Oct. 7, 2009, now Pat. No. 8,694,466.

(60) Provisional application No. 61/103,344, filed on Oct. 7, 2008.

(51) Int. Cl.
*G06F 17/30* (2006.01)

(52) U.S. Cl.
CPC .... *G06F 17/30156* (2013.01); *G06F 17/30038* (2013.01); *G06F 17/30088* (2013.01); *G06F 17/30153* (2013.01)

(58) Field of Classification Search
CPC .................. G06F 17/30156; G06F 17/30088; G06F 17/30153; G06F 17/30038
See application file for complete search history.

(56) References Cited

U.S. PATENT DOCUMENTS

| | | | |
|---|---|---|---|
| 5,293,251 A | | 3/1994 | Corcoran et al. |
| 6,105,021 A | * | 8/2000 | Berstis |
| 8,694,466 B2 | | 4/2014 | Rao et al. |
| 2003/0113027 A1 | | 6/2003 | Chan et al. |
| 2005/0125524 A1 | * | 6/2005 | Chandrasekhar et al. ..... 709/223 |
| 2006/0047974 A1 | * | 3/2006 | Alpern et al. ................. 713/191 |
| 2006/0067586 A1 | | 3/2006 | Mushano et al. |
| 2006/0235883 A1 | | 10/2006 | Krebs |
| 2007/0067362 A1 | * | 3/2007 | McArdle ....................... 707/204 |
| 2007/0152852 A1 | | 7/2007 | Suzuki et al. |
| 2007/0231781 A1 | * | 10/2007 | Zimmermann et al. ...... 434/350 |
| 2007/0282951 A1 | * | 12/2007 | Selimis et al. ................ 709/205 |
| 2008/0005141 A1 | | 1/2008 | Zheng et al. |
| 2009/0037964 A1 | | 2/2009 | Murray et al. |

(Continued)

OTHER PUBLICATIONS

"U.S. Appl. No. 12/574,990, Final Office Action mailed Jan. 31, 2012", 16 pgs.

(Continued)

*Primary Examiner* — Leslie Wong
(74) *Attorney, Agent, or Firm* — Kwan & Olynick LLP

(57) ABSTRACT

Embodiments deploy delayering techniques, and the relationships between successive versions of a rich-media file become apparent. With this, modified rich-media files suddenly present far smaller storage overhead as compared to traditional application-unaware snapshot and versioning implementations. Optimized file data is stored in suitcases. As a file is versioned, each new version of the file is placed in the same suitcase as the previous version, allowing embodiments to employ correlation techniques to enhance optimization savings.

16 Claims, 15 Drawing Sheets

(56) References Cited

U.S. PATENT DOCUMENTS

| | | | |
|---|---|---|---|
| 2009/0063899 A1 | 3/2009 | Jordan et al. | |
| 2009/0132616 A1* | 5/2009 | Winter et al. | 707/204 |
| 2009/0307251 A1* | 12/2009 | Heller et al. | 707/101 |
| 2011/0125720 A1* | 5/2011 | Jayaraman | 707/692 |
| 2012/0084672 A1 | 4/2012 | Vonog et al. | |
| 2012/0257622 A1 | 10/2012 | Tirpak | |

OTHER PUBLICATIONS

"U.S. Appl. No. 12/574,990, Final Office Action mailed Sep. 10, 2013", 10 pgs.

"U.S. Appl. No. 12/574,990, Non Final Office Action mailed Feb. 15, 2013", 9 pgs.

"U.S. Appl. No. 12/574,990, Non Final Office Action mailed Sep. 19, 2011", 15 pgs.

"U.S. Appl. No. 12/574,990, Notice of Allowance mailed Nov. 15, 2013", 10 pgs.

Ng, Chun-Ho, "Live Deduplication Storage of Virtual Machine Images in an Open-Source Cloud", Proceedings of ACM/IFIP/USENIX $12^{th}$ International Middleware Conference, Libson, Portugal, (Dec. 2011), [Online]. Retrieved from the Internet: < http://www.cse.cuhk.edu.hk/~pclee/www/pubs/middleware11.pdf >, 20 pgs.

* cited by examiner

| Metadata Database 201 | | | | | |
|---|---|---|---|---|---|
| Identifier 211 | Access Time 213 | Metadata 215 | | | |
| | | Name 221 | Create Time 223 | Size 225 | Ownership 227 | Group Ownership 229 |
| Metadata Database Entry 231 | | | | | |
| Metadata Database Entry 233 | | | | | |
| Metadata Database Entry 235 | | | | | |

Figure 2

| Optimized Multiple File Preamble 401 ||
|---|---|
| Next Index 411 | Next Offset 413 |
| Data Offset 421 | Data Length 423 |
| Data Offset 425 | Data Length 427 |
| Data Offset 429 | Data Length 431 |
| 1 Metadata 433 1 | Metadata 435 1 |
| 1 Metadata 437 1 | Metadata 439 1 |
| 1 Metadata 443 1 | Metadata 445 1 |
| Compressed Data 451 ||
| Compressed Data 453 ||
| Compressed Data 455 ||

Figure 4

OBJECT DEDUPLICATION AND APPLICATION AWARE SNAPSHOTS

CROSS-REFERENCE TO RELATED APPLICATIONS

This application claims benefit under 35 U.S.C. §120 to U.S. patent application Ser. No. 12/574,990, filed Oct. 7, 2009, entitled "OBJECT DEDUPLICATION AND APPLICATION AWARE SNAPSHOTS", which claims benefit under 35 U.S.C. 119(e) to U.S. Provisional Patent Application No. 61/103,344, filed Oct. 7, 2008, entitled "OBJECT DEDUPLICATION AND APPLICATION AWARE SNAPSHOTS". These applications are hereby incorporated in their entirety by this reference for all purposes.

BACKGROUND OF THE INVENTION

The present disclosure relates to file optimization.

When backup technology was first available, most of the data being backed up was in simple un-encoded data formats, such as ASCII or in un-encoded databases. The amount of data was typically in the order of megabytes or gigabytes. In contrast, in more recent backup workflows, the data is typically one the order of terabytes or petabytes and the files are in rich media format, including encoded images, compressed text sections and other complex object formats and data structures such as CAD drawings or seismic information.

Encoded files come in a number of encoded file formats. An encoded file (e.g. a rich media files) is one that has some level of obfuscation on top of the information contained in the file. This is usually because of some compression scheme applied to the file, like JPEG compression, ZIP (LZ) compression or something simple like RLE (Run Length Encoding) or BASE64 (found in email systems). The nature of most encoding schemes is such that the encoding of a particular byte depends on the preceding bytes. This means that a particular byte may be encoded (represented in bits) differently each time, if its history or preceding bytes are different. Encoded rich media documents have the property that any two documents that seem similar or same in information may be represented entirely differently in their bit representation on storage media.

SUMMARY OF THE INVENTION

Mechanisms are provided for optimizing multiple files in an efficient format that allows maintenance of the original namespace.

Rich media files or compound objects are parsed in a recursive fashion into primary objects, accompanied by ensuing block correlation and file optimization. In one embodiment, multiple files and associated metadata are written to a suitcase file. The suitcase file includes index information for accessing compressed data associated with compacted files. A hardlink to the suitcase file includes an index number used to access the appropriate index information. A simulated link to a particular file maintains the name of the particular file prior to compaction.

One aspect relates to a method of managing a data storage system. The method comprises: determining if a file is of a compound nature containing underlying primitive objects or of a primitive nature; extracting the underlying primitive objects from files determined to be compound, at least one extraction comprising two layers of decoding with two different codecs; correlating the extracted objects with the information they represent; and reducing information redundancy between two or more primitive objects within related or versioned files.

These and other features of the present invention will be presented in more detail in the following specification of the invention and the accompanying figures, which illustrate by way of example the principles of the invention.

BRIEF DESCRIPTION OF THE DRAWINGS

FIG. 2 illustrates a particular example of a metadata database.

FIG. 4 illustrates a particular example of a compacted file.

DETAILED DESCRIPTION OF THE PREFERRED EMBODIMENTS

Figure 1A:
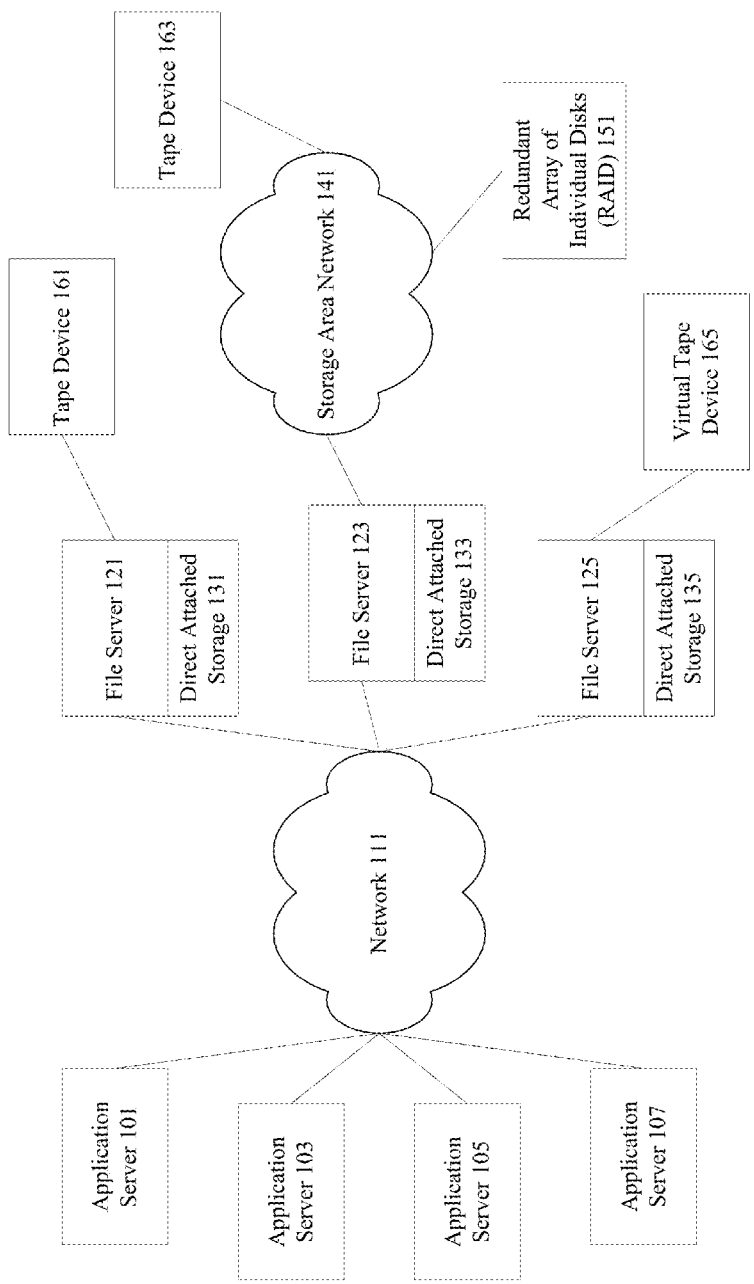
FIG. 1A illustrates a particular example of a network that can use the techniques and mechanisms of the present invention.
Figure 1B:
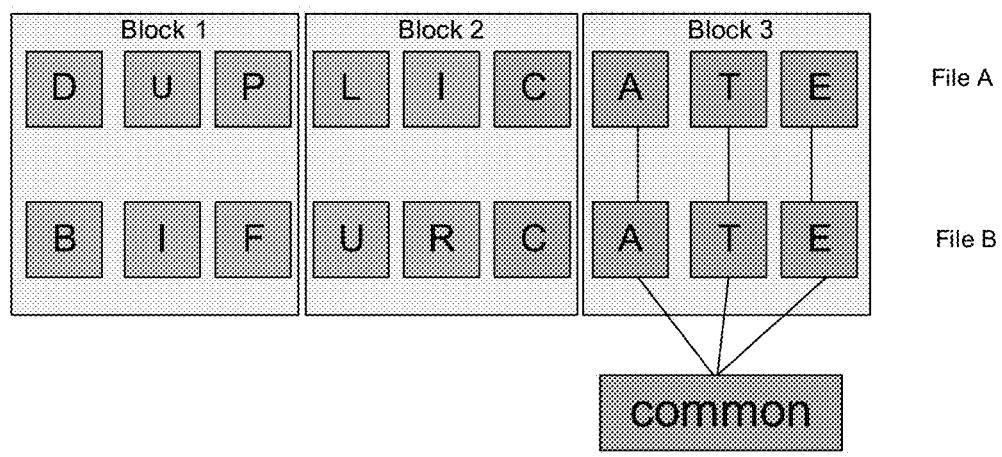
FIGS. 1B-1J illustrate various aspects of file optimization.

Traditional backup techniques involve sequentially writing a collection of files or blocks of a storage volume to a serial device like tape. Since backups are performed routinely, many versions of the same file (or in many cases, the same exact file) are backed up many times to different tape libraries over time. Since the rate of change in the storage content from two consecutive backups is likely to be low, consecutive tape backups have a high degree of redundancy between them.

Because of the inflexible and sequential nature of tape based systems, coupled with requiring manual handling in many cases, there has been a tremendous effort to move to disk based backup technology. However, due to the nature of backup workflows where entire online storage volumes are backed up routinely, disk based backup technology could become extremely expensive. To address this problem, various optimization techniques have been integrated into disk based backup solutions that utilize redundancy between consecutive archives.

Disk based backup technologies employ block level deduplication techniques whereby common blocks of various files are stored only once. Various implementations of this scheme differ in the minimum size of the blocks and the mechanism in which the blocks are chunked.

Current block deduplication schemes rely on content based hashing techniques where the blocks are hashed to a certain statistically unique value and blocks that hash to the same value are singly stored. The hashing techniques require that two blocks be exactly the same in order to produce the same hash value. The biggest difference in the implementation of current block deduplication technologies is the use of variable sized blocks versus fixed size blocks and the use of sliding windows to define the address of common blocks versus using fixed offsets to define the address of a block.

The most useful area for this type of deduplication implementation is in backup workflows where the same exact set of files are archived routinely and there is a relatively low change rate in the files. In these workflows, the files are backed up regardless of whether they have changed or not, so it is highly likely that there is a very high level of commonality between many blocks from one backup to another. In general, these techniques work well for text based or simple content and do not work very well for rich media file formats and workflows.

Furthermore, in online versioning schemes such as snapshots or in backup workflows where only the modified files are backed up, there is a very low likelihood of finding common blocks. In such schemes, block deduplication schemes will not yield any benefit and existing technologies for online archives (backups), snapshots and mirroring become expensive.

In situations where many files are similar but not the same, common blocks will not be present, but there still is a high level of information redundancy that is not being optimized.

Aspects of the invention relate to addressing the problems posed by workflows which are not conducive to block based deduplication schemes and those posed by rich media file formats.

One embodiment relates to an alternative approach to block based deduplication schemes that incorporate an understanding of the file contents at an application layer and to usage of that intelligence to optimally store redundant information across different versions of the same file as well as similar files which do not contain any common blocks.

In order to better understand the disclosed embodiments, it is beneficial to discuss block based deduplication schemes and look at some of the challenges posed by rich media files at an application layer.

Fixed Block Single Instancing Schemes

These schemes chunk blocks at fixed sizes, usually starting from the beginning of a file. They historically stem from block allocation schemes used in file systems. Any file that has a storage block which is exactly the same as a storage block in another file essentially shares that block with some form of reference counting. FIG. 1A depicts a simplified example of two files having blocks 1, 2, and 3, with one block in common, block 3.

Even though block 2 in FIG. 1A shares a common element (letter "C" with file A and file B), it is excluded from the optimization since the commonality does not encompass an entire fixed size block. Block 3 however is fully optimized. Reference counting is used so that the block will only be freed when all references to that block are freed (for example, when all files that own that block are deleted).

Figure 1C:
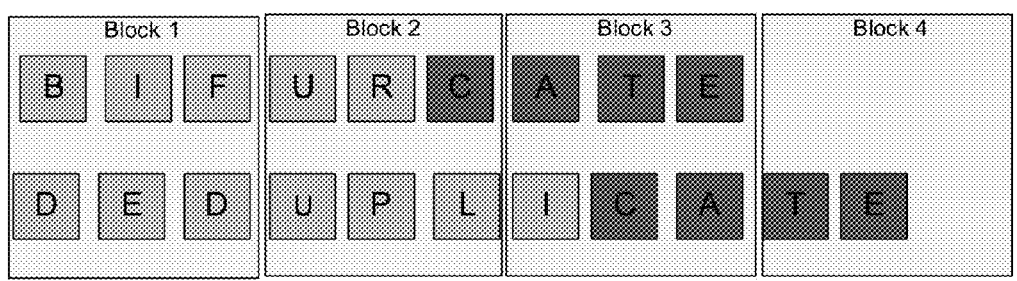

The biggest drawback with this scheme is when the file contents shift, as seen in FIG. 1C. In FIG. 1C, none of the blocks 1-4 in file A match that of file B due to the change in file B contents (deduplicate as opposed to duplicate). When this happens, the probability is extremely low that any fixed size block with static addresses will match those of a shifted file.

The situation described with regard to FIG. 1C is quite common in workflows where every revision of a file is being backed up or in workflows where similar files with highly redundant information are being encoded and written to disk.

Another issue with fixed block instancing systems, depending on the implementation is the unnecessary increase in the number of hashes that need to be managed even though two common blocks appear consecutively.

Sliding Window Block Single Instancing Schemes

Figure 1D:
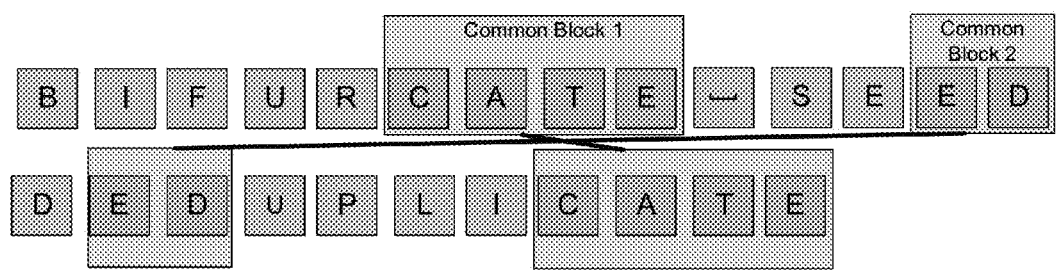
Figure 1E:
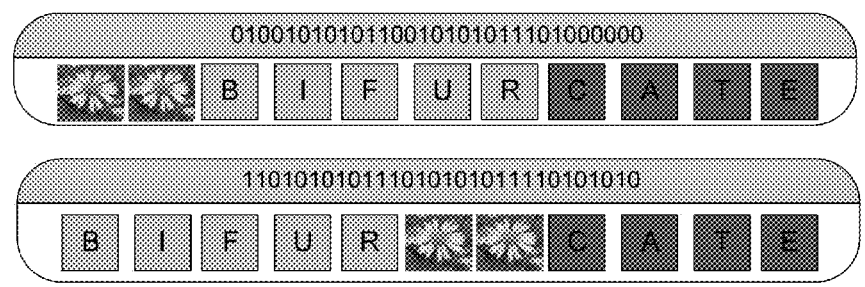

Sliding window schemes are more effective than the fixed block hashing techniques because the start and end of common blocks are variable as opposed to fixed offsets with respect to the beginning of a file. Most schemes typically employ some form of a cyclic hash function that is capable of detecting longest match sequences between files. This overcomes the two problems from the fixed block deduplication schemes namely; shifting of common blocks and coalescing of multiple common blocks into one larger chunk. FIG. 1D depicts a sliding window deduplication scheme. File A and file B share common blocks 1 and 2 in different areas having different offsets with respect to the beginning of each file.

Rich Media Files

Rich media files such as images, video, and computer generated files such as CAD are responsible for the bulk of storage related growth today. Most rich media files are encoded documents. As described earlier, most forms of encoding have the effect of changing the storage representation of each byte based on the history of bytes encountered so far. Due to this carry forward effect of encoding, small changes in any part of the file typically affect the bit pattern representation of the entire file. In addition to this effect, many applications tend to transform and change the data structure of a file even if a small element of that data structure changed, causing the entire file to appear different to the storage system. For example, adding one slide in a PowerPoint file can rearrange the layout of the entire PowerPoint file data structure.

Another property of rich media files is that they typically contain objects of different data types. For example, a presentation can contain text data coexistent with image data. Typically changes in rich media documents are isolated to just a few of these embedded objects instead of the entire document.

FIG. 1D depicts the nature of a small change in a rich media document and its bit storage representation.

Extract, Correlate and Optimize (ECO) for Rich Media Files

Embodiments optimally store rich media documents and address common workflows associated with rich media documents: a) Backup of various versions of rich media documents; b) Snapshots of changes in rich media documents; and c) applications that cause correlated rich media documents such that they contain information redundancy. Examples include medical images, animation frames and scientific experiment result files to name a few.

Objects within rich media documents can be broadly classified in two categories:

a) Compound Objects. These are objects that encapsulate a multiple of other objects. Examples include tar archives and zip archives to name a few. They are typically encoded representations of the union of their contained objects; and b) Primitive Objects. These are the most basic representations of discrete data structures such as images, drawings, and executables to name a few. Some examples include JPEG images, TIFF images, CAD drawings, Visio Objects and AVI clips.

Extraction, Correlation, and Optimization of Primitive Objects

Figure 5A:
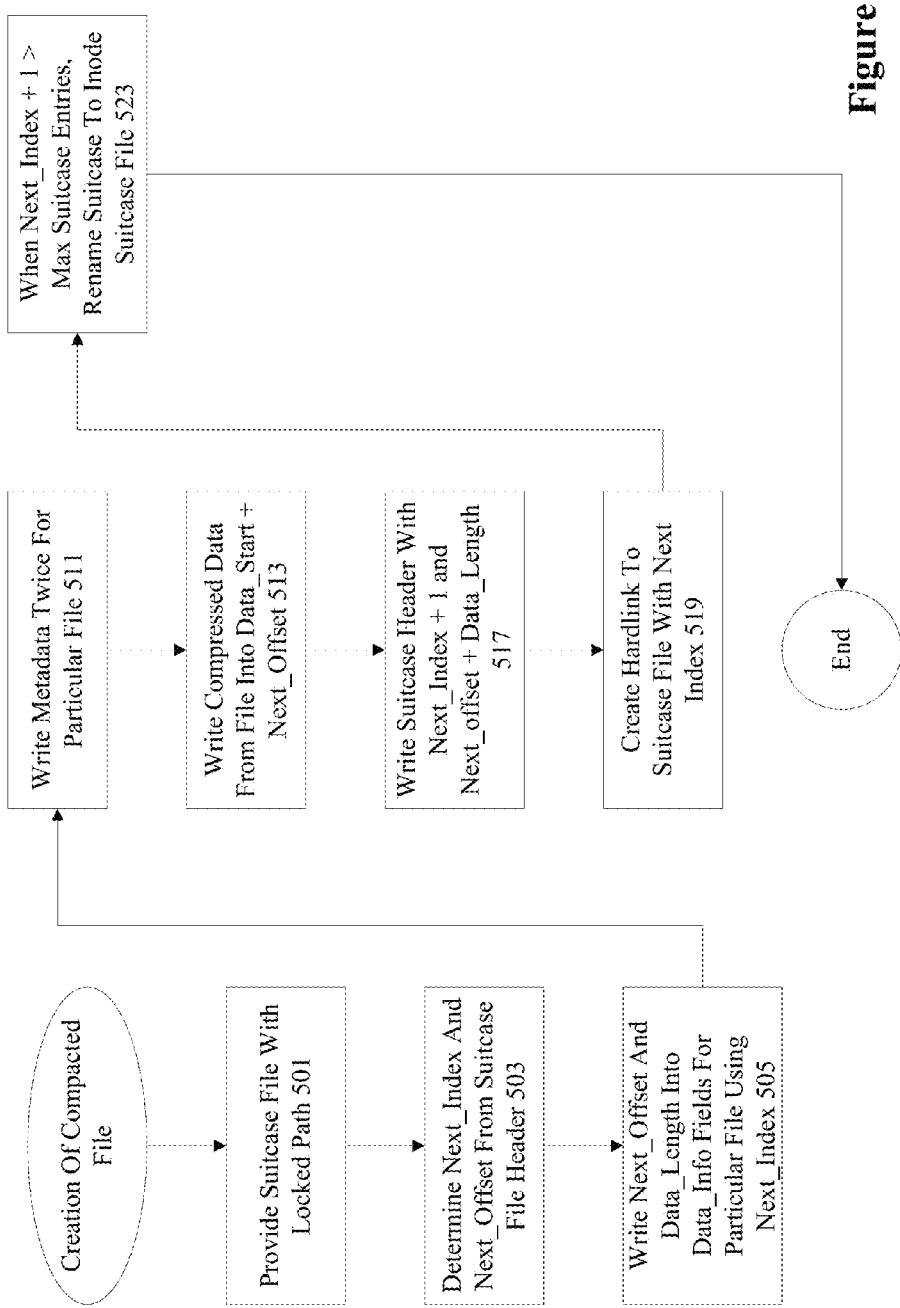
FIG. 5A illustrates a particular example of compacted file creation.
Figure 5B:
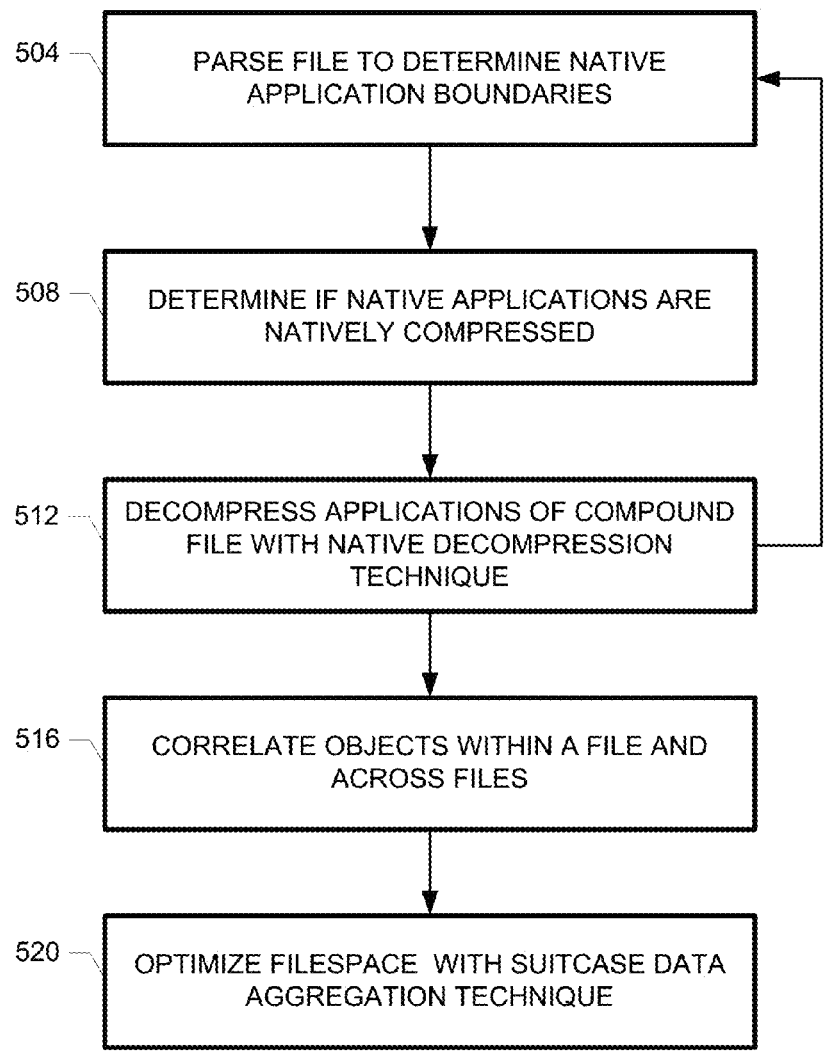
FIG. 5B illustrates a particular example of rich media file optimization.

FIG. 5A is a flowchart illustrating compound object or rich media file optimization. In step 504 the system will parse a file to determine if it is compound or primitive and determine the native application boundaries. In other words it will determine the boundaries of the primitive objects within the compound object. For example, the first stage in optimizing a version of a rich media document is to extract or decode the information contained in it. Most rich media documents employ a variety of common encoding schemes such as ZIP, DEFLATE, BASE64, RLE to mention a few. Furthermore they differ in the specific document headers they use to identify the encoded sections and objects. Parsing may be accomplished through analysis of the file headers to determine the encoding formats within the compound object and underlying primitives. The extraction process is recursive. In many rich document formats, the underlying primitive object (such as an image or a text object) may be under multiple layers of encoding as depicted in FIG. 5B.

After the extraction process, the result is a sequence of adjacent primitive objects. These objects differ in data structures and information type and require different optimization techniques to deal with each object. In step 508, the system will then determine if the native applications and/or primitive objects are natively compressed. This is again, a recursive process as layer after layer is uncovered until the uncompressed data of the lowest level primitive object is uncovered. In step 512 the system will decompress each of the applications or objects of the compound file/object with the appropriate decompression technique(s) and algorithm(s).

Then in step 516, the system will correlate objects within a file and across files. The objects within a file and across files may often be heavily correlated with respect to the information they represent or in many cases could be identical objects. The correlation stage in rich media file optimization will facilitate optimal storage of these objects. The manner in which an object is correlated with another object depends on the type of object. Image objects for example use a different object correlation algorithm compared to text objects.

Figure 1F:
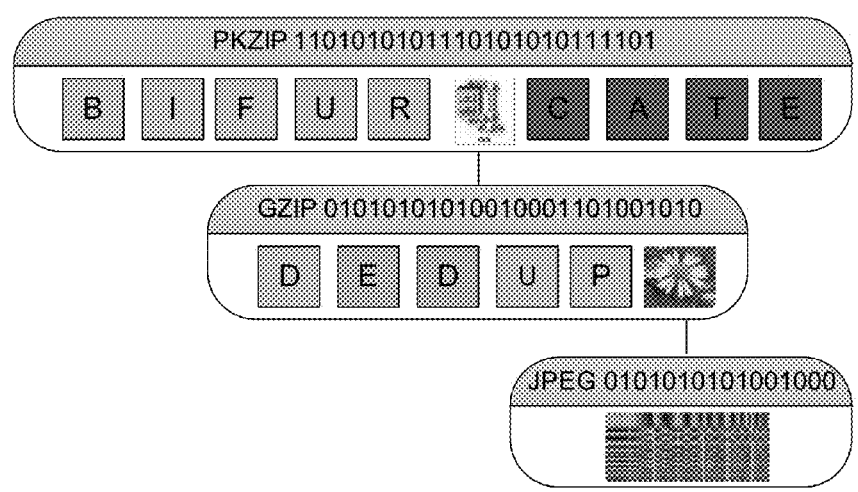
Figure 1G:
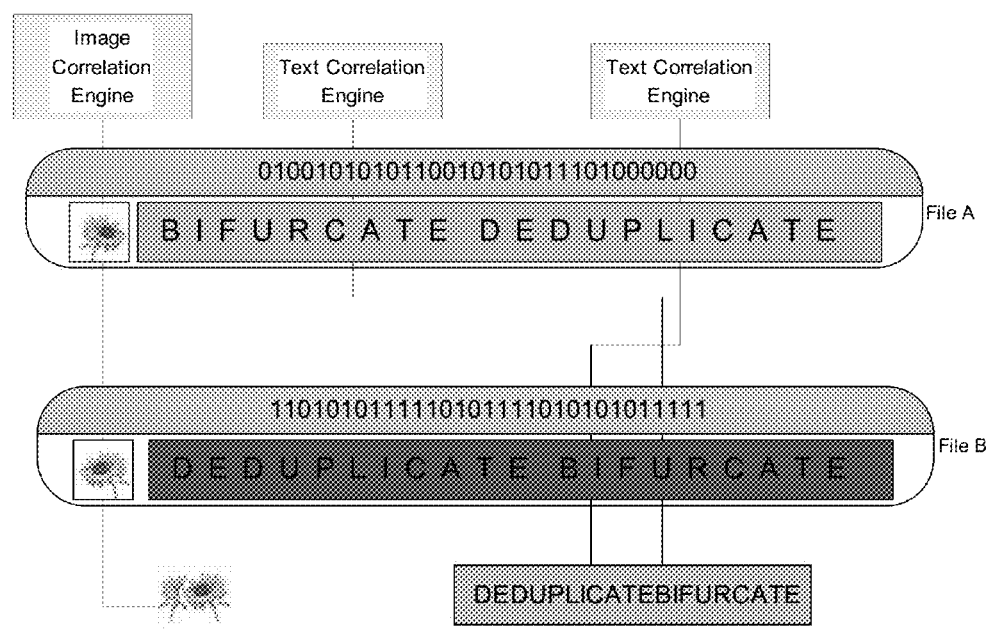

As described with regard to FIG. 1D, a small change in any one object may result in a change in the bit stream of the entire file. However, after the extraction process, it is possible to identify common objects. Slightly altered objects within versions of a file or across files that have redundant information may be identified. This, for example, may involve text sections which are similar or derivatives (versions) of the same text object which happen to have been encoded in the rich media document. FIG. 1F depicts such a situation.

Different approaches are used for defining common or correlated objects. In many cases, since various versions of the same file or information are used, the names and logical location of the objects with in a rich media file are the same. In other cases, where the process by which the related documents are created are unknown, a post process stage is deployed which scans various files for related or common objects.

Correlation may be based on namespace in some embodiments. The most common use of the embodiments is to backup and replicate multiple revisions or changes in the same file. For this, a process is deployed which constantly monitors the source files system for modified or newly added files and asynchronously replicates them to the backup storage area. In the process of doing this, the system will detect that the same file (by way of the same namespace) is being backed up or versioned again and write the optimized version of that new file in a suitcase file.

In step 520, the system will then optimize the subject filespace with a suitcase based data aggregation technique. Optimization of singular primitive objects involves the usage of primitive object specific optimization algorithms, such as a JPEG re-compressor, AVI compressor, MPEG compressor, TIFF compressor or SEG-Y compressor to name a few. Each primitive object type requires an object specific compression algorithm capable of parsing and optimizing the data structures represented by that object type. For example, TIFF images have specific header information that describe the representation of the image and any compression scheme that may have been used, and a TIFF object re-compressor will be able to parse those header details and further optimize the underlying imagery data.

FIGS. 1A and 2-5A relate to one particular optimization system and techniques that may be used in compaction and compression as portion of the correlation and optimization described above. FIG. 1 illustrates a particular example of a network that can use the techniques and mechanisms of the present invention. Applications servers 101, 103, 105, and 107 are connected to file servers 121, 123, and 125 through a network 111. A network 111 may be a single network or a combination of different networks. According to various embodiments, each application server 101, 103, 105, and 107 runs applications that require data storage. The file servers 121, 123, and 125 provide data storage through active storage mechanisms such as disk arrays. One example of active storage is a Redundant Array of Individual Disks (RAID) 151 connected to file server 123 through storage area network (SAN) 141. The file servers 121, 123, and 125 also provide data storage through passive storage mechanisms such as tape devices 161 and 163, and virtual tape device 165.

According to various embodiments, applications servers 101, 103, 105, and 107 are connected to file servers 121, 123, and 125 using file level protocols such as Server Message Block (SMB), Network File System (NFS), or the Andrew File System (AFS) that are capable of providing network attached storage (NAS) to heterogeneous clients. In particular examples, NAS includes both a file system and storage. SMB, NFS, and AFS generally allow application servers 101, 103, 105, and 107 to access data at the file level. The file servers 121, 123, and 125 then use block level protocols such as serial advanced technology attachment (SATA), Internet Small Computer Systems Interface (iSCSI), and storage area networks (SANs) to access individual blocks of data.

Block level protocols generally do not provide any file system capabilities to file servers but instead leave file system operations on the application server side. The data accessed by the file servers 121, 123, and 125 may be physically stored on direct attached storage 131, 133, and 135, such as hard drives included in the corresponding file servers. Alternatively, the data may be physically stored on tape devices 161 or 163, or on virtual tape device 165. A virtual tape device 165 may be implemented as an array of disks. The data may also be stored on RAID 151 connected over a SAN 141.

According to various embodiments, a file area metadata service may be implemented at application servers 101, 103, 105, and 107, at network 111, or at file servers 121, 123, and 125 or at a combination of entities. The file area metadata service intercepts client request and responds to the client request with a response expected by the client. For example, if a client associated with application server 101 requests the size of a particular file, the size of the particular file in non optimized form is provided in the response even though the particular file may now have a different size because of compression and/or compaction. In particular examples, the file area metadata service may intercept the request at an application server 101, at a switch in a network 111, or at a file server 121 and respond with the appropriate metadata. The namespace can continue to be maintained by the file system.

FIG. 2 is illustrates a particular example of a metadata database. Many file systems keep file metadata out-of-band. Some systems keep metadata in directory entries. Others keep metadata in specialized structures like inodes or even in the name of a file. Metadata can range from simple timestamps, mode bits, and other special-purpose information used by the implementation itself, to icons and free-text comments, to arbitrary attribute-value pairs.

The techniques and mechanisms of the present invention contemplate a metadata database 201 having metadata database entries 231, 233, and 235. According to various embodiments, each entry includes an identifier 211, an access time 213, and metadata 215. In particular examples, metadata 215 includes name 221, create time 223, size 225, ownership 227, and group ownership 229. According to various embodiments, the identifier 211 is a unique identifier such as an inode number associated with a file. The inode number of a file can be used as a lookup key as the inode number does not change during the lifetime of a file. A variety of time stamps can be used to allow post-retrieval validation. According to various embodiments, timestamps in a metadata database are compared with timestamps in a corresponding file. The comparison avoids possible misuse of stale metadata database entries for a recently restored file.

Figure 3:
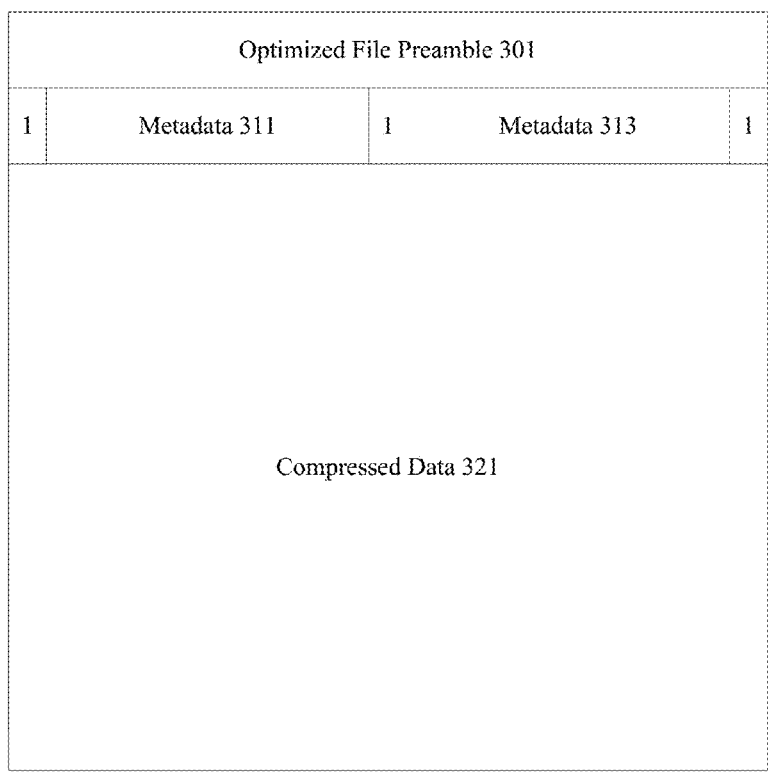
FIG. 3 illustrates a particular example of a compressed file.

FIG. 3 illustrates one example of an optimized file. The optimized file includes an optimized file preamble 301. The optimized file also includes compressed data 321. According to various embodiments, metadata is written twice as metadata 311 and metadata 313. Individual bits surround metadata fields 311 and 313. In particular examples, if the bits surrounding a particular metadata entry have not been written, the metadata entry is not considered to be committed. Using bits surrounding the metadata provides a semblance of an atomic operation. If all bits are written, the metadata 311 and 313 can be considered accurately written. If some surrounding bits are not yet written, the metadata may be considered as not yet committed. According to various embodiments, metadata 311 and metadata 313 is configured to be a block size that can be atomically written by a hard drive.

In particular examples, all operations are designed such that, should a crash occur at any point, there is no loss or corruption of data. However, there can be stale files or database entries left behind. Attempting to eliminate this possibility is a very complex problem which dictates the need for transactional semantics across multiple file system and database operations. Since the situation arises only when a poorly-timed failure occurs, and results only in additional space usage, the entire design is not burdened with excess complexity. According to various embodiments, a periodic garbage collection routine is used to discover and clean up any unnecessary files or database entries.

It should be noted that namespace information continues to be maintained by the file system and need not to be stored in any compressed file.

FIG. 4 illustrates another example of an optimized file. According to various embodiments, the optimized files may be compacted files having information obtained from multiple files or all files in a directory. The techniques of the present invention recognize that data can be more efficiently optimized when multiple files instead of individual files are evaluated for optimization. Patterns and characteristics across files and file types can be analyzed to allow for more efficient compression, storage, and retrieval. An optimized file includes an optimized multiple file preamble 401. The preamble 401 provides some kind of uniqueness to the file. An optimized file including multiple compressed files is also referred to herein as a suitcase file. In some instances, a suitcase file may include all files in a particular directory.

The optimized file includes a next index 411 and a next offset 413 that can be used for adding and deleting compressed and/or compacted data. Data offsets 421, 425, and 429 along with data lengths 423, 427, and 431 are used to determine positions of compressed data 451, 453, and 455. Metadata 433, 437, and 443 are redundantly written as metadata 435, 439, and 445. Commit bits surround metadata 433, 435, 437, 439, 443, and 445. In particular examples, if the bits surrounding a particular metadata entry have not been written, the metadata entry is not considered to be committed. Using bits surrounding the metadata provides a semblance of an atomic operation. If all bits are written, the metadata can be considered accurately written. If some surrounding bits are not yet written, the metadata may be considered as not yet committed. According to various embodiments, metadata is configured to be a block size that can be atomically written by a hard drive.

According to various embodiments, to add an additional file to a suitcase file, an additional data offset and data length field is introduced along with an additional redundant written metadata field. The compressed data itself is added using the data offset and data length introduced. Both compressed and compacted files can be created with relative ease using the optimized file formats shown in FIGS. 3 and 4.

FIG. 5A illustrates one example of compacted file creation. At 501, a suitcase file with a locked path is provided. According to various embodiments, the suitcase file path is locked and the suitcase file itself is opened. If the suitcase file does not exist, a file such as sc.ofs is created. In particular examples, only one active suitcase file is permitted per directory. At 503, the next_index and next_offset are determined from the suitcase file. At 505, the next_offset and data_length fields are written into the data_length and data_info fields for a particular file at the next_index 505 value. At 511, the metadata is written twice for a particular file. At 513, the compressed data from the file is written into the data start+ next_offset position. In some instances, the data from the file may already be compressed or compacted. At 517, a suitcase header is written with next_index+1 and next_offset+data_length.

According to various embodiments, a hard link is created for the suitcase file with filename.<next_index>.ofs at 519. In particular examples, the filename is used to provide uniqueness within the directory. The filename also allows a garbage collector to check that the hard link remains active. A simulated link (symlink) can be associated with an index file name. In this manner, client applications continue to have a consistent view of data files. Symlink files correspond to client application maintained file names. The file name includes an encoded file index for accessing the appropriate metadata and compressed data corresponding to a particular file. In this manner, a client can access metadata and compressed data in a suitcase file while maintaining use of an original file name.

When the next_index+1 reaches a maximum at 523, the suitcase file is renamed to <inode>.sc.ofs. The rename prevents adding new entries into the suitcase file. In particular examples, the inode name guarantees uniqueness within the resource point and, hence, directory. The rename also allows a garbage collector to easily unlink the suitcase once the link count reaches one. The suitcase path can then be unlocked.

For further information on correlation, optimization and related technology, please refer to the following patent application serial numbers, hereby incorporated by reference in the entirety: Ser. No. 12/038,219 filed on Feb. 28, 2008 and entitled "VIRTUALIZATION OF METADATA FOR FILE OPTIMIZATION"; Ser. No. 12/038,223 filed on Feb. 27, 2008 and entitled "MULTIPLE FILE COMPACTION FOR NETWORK ATTACHED STORAGE"; Ser. No. 12/470,469 filed on May 21, 2008 and entitled "EFFICIENT DATA COMPRESSION & DECOMPRESSION OF NUMERIC SEQUENCES."

The optimization stage is also advantageous in that in will reduce the information redundancy between two or more primitive objects within related or versioned rich media documents.

Figure 1H:
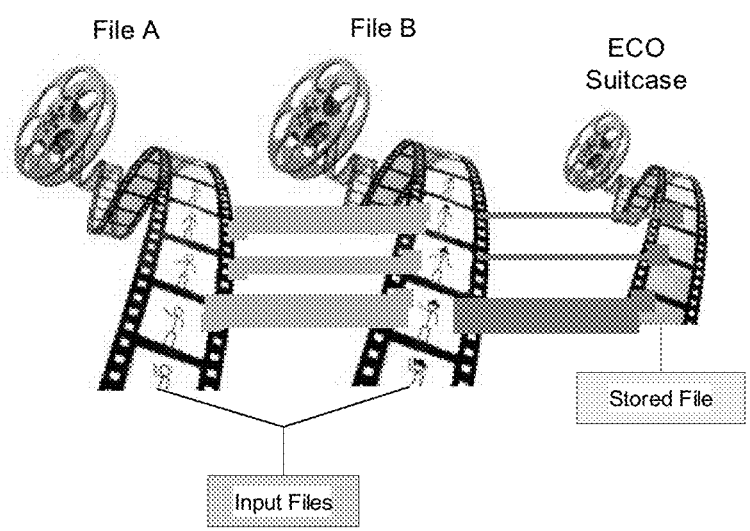

For example, in an AVI primitive object, each frame can be seen as a sequence of bitmap files after the images have been extracted. Between two AVI input files, file A and file B, that are related or versioned documents, each corresponding frame between the two AVI files may be relatively delta compressed into one stored file, as shown in FIG. 1H.

Figure 1I:
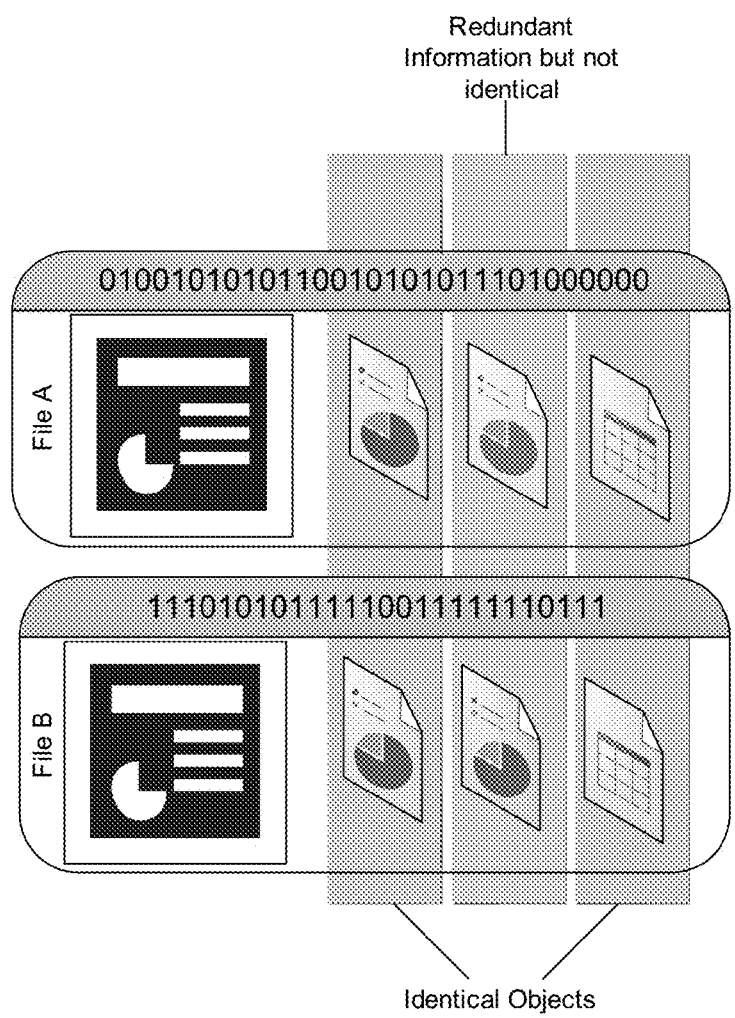

In another example, two compound document format files such as a PowerPoint document may be related and have similar content but with some differentiating content. FIG. 1I depicts how two PowerPoint files may be optimized with respect to each other.

Figure 1J:
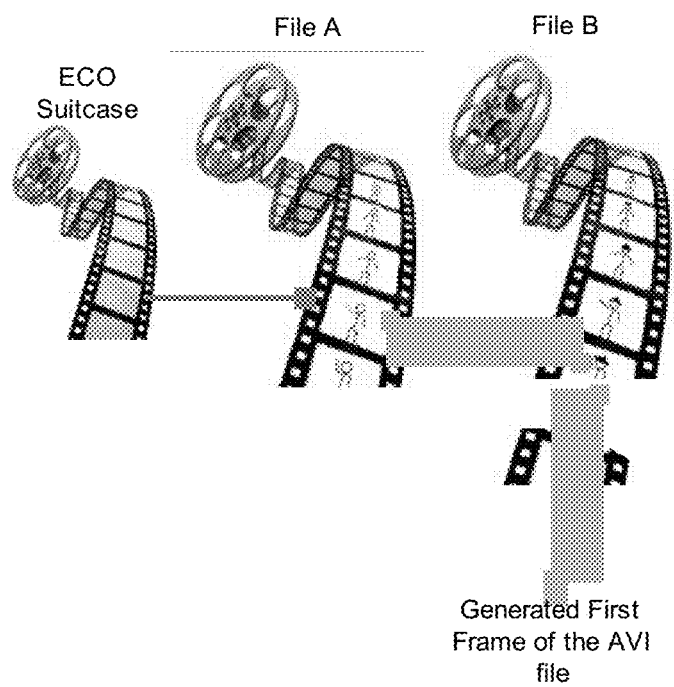

Such archives where correlated documents are relatively optimized are known as correlated document archives ("CDA"s). On such CDA is shown in FIG. 1J.

A very common use case for the example depicted above is when a file gets modified and the older version of the file gets snapshotted. In this case, much of the information between the versions of the same file is likely to be the same. Extracting the objects enables optimization of the versions to a satisfactory level.

Since the implementation of the above technology lends itself to easy end user visibility and access of the optimized information, the response times in the extraction of the optimized documents is more important than traditional backup technologies such as disk based backup techniques, where an IT administrator is typically required to restore a file.

Embodiments are thus sensitive to end user access times of any arbitrary document even if the document were part of a correlated optimization archive.

The specific optimization data structure schemes used for correlating and optimizing objects across different files take this into consideration. As can be seen in FIG. 7, to retrieve the first frame of the Nth AVI file, only the first N–1 frames of the previous AVI files need to be processed. The location of a specific object within an optimized ECO suitcase is known as its "depth" within the suitcase. As long as the relative time to reach the depth is kept at a minimum, the time to the first byte of restoring a particular document (and hence its access time) will be kept low. FIG. 9 depicts the access of an Nth rich document with in an ECO Archive. To return the first byte of the requested Nth document will take at most N–1 object de-correlations. As depicted in FIG. 9, only the first frame from file A needs to be processed before the first frame of the requested File B can be retrieved.

Embodiments provide the user with 2 separate views into historical file system information.

Snapshots view presents a view of the full file system as it appeared on a given date. This allows the user to navigate a full working set of files, regardless of the date at which changes took place.

Versions view provides the user with versions of a file according to the date on which the file changed. Using this view, the user can quickly locate distinct versions of a file without having to search through a large number of full snapshot directories. Through the Ocarina Client, the user is presented with a .ecosnap/versions/<date>directory hierarchy. When the user enters a date directory, they are presented with only the files that changed on the corresponding date.

Optimized file data is stored in suitcases. As a file is versioned, each new version of the file is placed in the same suitcase as the previous version, allowing embodiments to employ correlation techniques to enhance optimization savings.

By taking advantage of delayering techniques, the relationships between successive versions of a rich-media file become apparent. With this, modified rich-media files suddenly present far smaller storage overhead as compared to traditional application-unaware snapshot and versioning implementations.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
    parsing a file to identify boundaries for a plurality of first level objects included in the file in order to determine whether each of the plurality of first level objects is compound or primitive, wherein a first compound object included in the file encapsulates a plurality of second level objects and a primitive object is the most basic representation of a discrete data structure in the file;
    recursively parsing the first compound object to identify boundaries for a plurality of second level objects included in the first compound object;
    determining whether each of the plurality of second level objects is compound or primitive;
    identifying a plurality of lowest level primitive objects, wherein the plurality of lowest level primitive objects are basic representations of discrete data structures, wherein metadata for each of the plurality of lowest level primitive objects is stored redundantly in a suitcase file, and wherein deduplication boundaries are set at boundaries of the plurality of lowest level primitive objects;
    decompressing the plurality of lowest level primitive objects;
    recompressing the plurality of lowest level primitive objects with a plurality of object specific optimization algorithms.

2. The method of claim 1, wherein object based deduplication is applied to the plurality of lowest level primitive objects.

3. The method of claim 1, wherein compound object include zip archives and PDF files.

4. The method of claim 1, wherein primitive objects include JPEG images, TIFF images, and CAD drawings.

5. The method of claim 1, wherein deduplication is applied to the plurality of lowest level primitive objects.

6. The method of claim 1, wherein index information is stored in the suitcase file to allow access to each of the plurality of lowest level primitive objects.

7. The method of claim 6, wherein an index number in a file name is used to access index information in the suitcase file to allow access to corresponding compressed data in the suitcase file.

8. A non-transitory computer readable medium comprising:
    computer code for parsing a file to identify boundaries for a plurality of first level objects included in the file in order to determine
    whether each of the plurality of first level objects is compound or primitive, wherein a first compound object included in the file encapsulates a plurality of second level objects and a primitive object is the most basic representation of a discrete data structure in the file;
    computer code for recursively parsing the first compound object to identify boundaries for a plurality of second level objects included in the first compound object;
    computer code for determining whether each of the plurality of second level objects is compound or primitive;
    computer code for identifying a plurality of lowest level primitive objects, wherein the plurality of lowest level primitive objects are basic representations of discrete data structures, wherein metadata for each of the plurality of lowest level primitive objects is stored redundantly in a suitcase file, and wherein deduplication boundaries are set at boundaries of the plurality of lowest level primitive objects;

computer code for decompressing the plurality of lowest level primitive objects;

computer code for recompressing the plurality of lowest level primitive objects with a plurality of object specific optimization algorithms.

9. The non-transitory computer readable medium of claim 8, wherein object based deduplication is applied to the plurality of lowest level primitive objects.

10. The non-transitory computer readable medium of claim 8, wherein compound object include zip archives and PDF files.

11. The non-transitory computer readable medium of claim 8, wherein primitive objects include JPEG images, TIFF images, and CAD drawings.

12. The non-transitory computer readable medium of claim 8, wherein deduplication is applied to the plurality of lowest level primitive objects.

13. The non-transitory computer readable medium of claim 8, wherein index information is stored in the suitcase file to allow access to each of the plurality of lowest level primitive objects.

14. The non-transitory computer readable medium of claim 13, wherein an index number in a file name is used to access index information in the suitcase file to allow access to corresponding compressed data in the suitcase file.

15. A system comprising:
an interface operable to receive a file comprising a plurality of first level objects;
a parser operable to recursively parse the file to identify a plurality of first level objects, second level objects, and lowest level objects included in the file;
a processor configured to determine through parsing the file whether each of the plurality of first level objects is compound or primitive, wherein a first compound object included in the file encapsulates a plurality of second level objects and a primitive object is the most basic representation of a discrete data structure in the file, the processor further configured to determine whether each of the plurality of second level objects is compound or primitive, wherein the plurality of lowest level primitive objects are identified, wherein the plurality of lowest level primitive objects are basic representations of discrete data structures, wherein metadata for each of the plurality of lowest level primitive objects is stored redundantly in a suitcase file, and wherein deduplication boundaries are set at boundaries of the plurality of lowest level primitive objects;
a decompression mechanisms configured to decompress the plurality of lowest level primitive objects, wherein the plurality of lowest level primitive objects are recompressed with a plurality of object specific optimization algorithms.

16. The system of claim 15, wherein object based deduplication is applied to the plurality of lowest level primitive objects.

* * * * *